(12) United States Patent
Jaskiewicz

(10) Patent No.: US 11,002,370 B2
(45) Date of Patent: May 11, 2021

(54) APPARATUS FOR CONVERTING ROTATIONAL MOVEMENT TO LINEAR MOVEMENT

(71) Applicant: Hamilton Sundstrand Corporation, Charlotte, NC (US)

(72) Inventor: Zbigniew Jaskiewicz, Wrocław (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 229 days.

(21) Appl. No.: 15/988,507

(22) Filed: May 24, 2018

(65) Prior Publication Data

US 2018/0340619 A1    Nov. 29, 2018

(30) Foreign Application Priority Data

May 25, 2017 (EP) .................................... 17461537

(51) Int. Cl.
*F16K 5/12* (2006.01)
*F16H 57/04* (2010.01)
*F16H 25/20* (2006.01)

(52) U.S. Cl.
CPC .............. *F16K 5/12* (2013.01); *F16H 25/20* (2013.01); *F16H 25/2006* (2013.01); *F16H 57/0436* (2013.01); *F16H 57/0497* (2013.01)

(58) Field of Classification Search
CPC ... F16K 5/12; F16K 5/22; F16K 5/225; F16K 3/36; F16H 25/2006; F16H 57/0436; F16H 57/0497; F16H 25/2009; F16H 56/0435

See application file for complete search history.

(56) References Cited

U.S. PATENT DOCUMENTS 3,064,758 A * 11/1962 Ohrnberger .............. B23Q 5/40
                                                       184/6.12
3,226,081 A * 12/1965 Milleville ................. F16K 3/36
                                                       251/355

(Continued)

FOREIGN PATENT DOCUMENTS

DE        3532352 A1     3/1986
EP        0860628 A2     8/1998

(Continued)

OTHER PUBLICATIONS

Extended European Search Report for International Application No. 17461537.7 dated Nov. 14, 2017, 8 pages.

(Continued)

*Primary Examiner* — Michael R Reid
(74) *Attorney, Agent, or Firm* — Cantor Colburn LLP

(57) ABSTRACT

An apparatus for converting rotational movement into linear movement is disclosed. The apparatus comprises: a screw member having a threaded external surface and a sleeve member having a threaded interior surface for receiving the threaded external surface of the screw member, wherein the threaded surfaces are configured so that rotation of the screw member relative to the sleeve member, in use, causes the screw member to move axially relative to the sleeve member. The apparatus may also comprise a force applicator for applying pressure to the region between the screw member and sleeve member so as to urge the external surface of the screw member and the opposing interior surface of the sleeve member apart from each other.

13 Claims, 8 Drawing Sheets

(56) References Cited

U.S. PATENT DOCUMENTS 3,620,502 A * 11/1971 Lawson .................... F16K 3/36
                                                                                              251/355
4,232,562 A * 11/1980 Perkins .................. F16H 25/20
                                                                                             128/DIG. 1
4,503,888 A     3/1985 Brovold

FOREIGN PATENT DOCUMENTS

| GB | 914165 A | 12/1962 |
| GB | 915275 A | 1/1963 |
| GB | 1342576 A | 1/1974 |
| JP | 2016215254 A | 12/2016 |

OTHER PUBLICATIONS

EPO Official Letter for Application No. 17461537.7, dated Aug. 28, 2020, 5 pages.

* cited by examiner

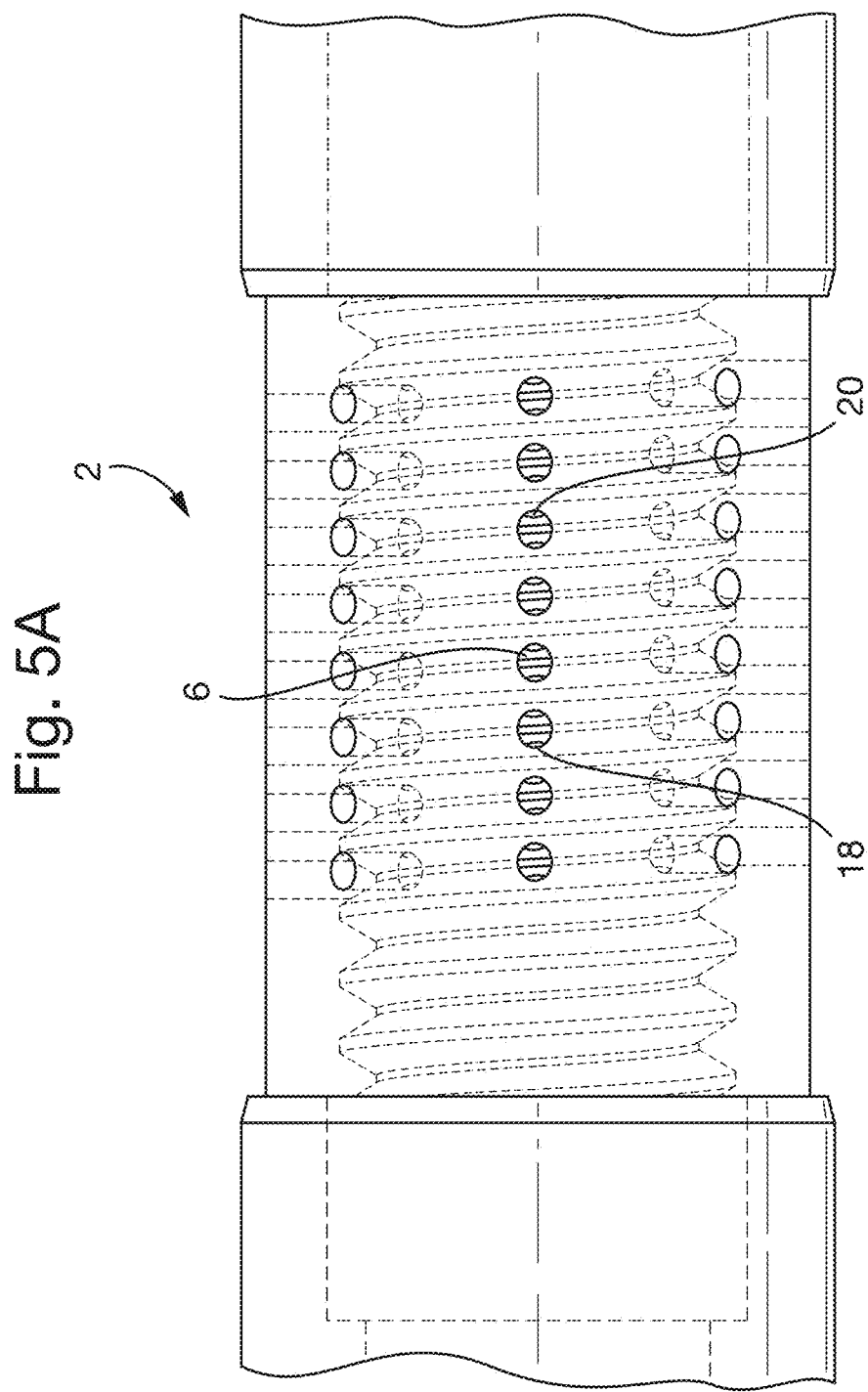

APPARATUS FOR CONVERTING ROTATIONAL MOVEMENT TO LINEAR MOVEMENT

FOREIGN PRIORITY

This application claims priority to European Patent Application No. 17461537.7 filed May 25, 2017, the entire contents of which is incorporated herein by reference.

FIELD

The present disclosure relates generally to assemblies for converting rotational movement into linear movement and in embodiments related to hydraulic valves and apparatus for controlling flow through such valves.

BACKGROUND

Proportioning valves using a linear motor are known and a schematic of such a valve is shown in FIG. 1A. However, current proportioning valves have good flow characteristics only in a certain operating range of the device. FIG. 1B shows the fluid flow through such a proportioning valve as a function of the control signal applied to the valve. Initially, as the magnitude of the control signal is increased, the fluid flow through the valve does not significantly increase. This is known as a dead zone and is depicted as region "a" in FIG. 1B. In region "b", the fluid flow increases substantially linearly as the magnitude of the control signal is increased. The valve therefore has good flow characteristics in this operating range. Region "c" is a zone of deformation characteristics due to the operating characteristics of the linear motor. Engines using such motors typically have a limited stroke length of approximately 5.2 mm.

It is known to use hydraulic screws and motors instead of a linear motor in order to eliminate the above inconvenience, as a hydraulic screw operates with the desired valve characteristics throughout its entire range of travel. It is also possible to increase the stroke of the valve spool. The external dimensions of a valve using this technology is also comparable to that using the linear motor.

U.S. Pat. No. 4,503,888 discloses a rotary to linear control for actuating an axially movable spool of a rotary input servo-valve.

SUMMARY

From a first aspect the present disclosure provides an apparatus for converting rotational movement into linear movement, said apparatus comprising: a screw member having a threaded external surface; a sleeve member having a threaded interior surface for receiving the threaded external surface of the screw member; wherein the threaded surfaces are configured so that rotation of the screw member relative to the sleeve member, in use, causes the screw member to move axially relative to the sleeve member; and a force applicator for applying pressure to a region between the screw member and sleeve member so as to urge an external surface of the screw member and an opposing interior surface of the sleeve member apart from each other.

For the avoidance of doubt, the axial movement described herein is movement in the longitudinal direction of the (elongated) screw member, i.e. in a direction through the sleeve member.

The sleeve member described herein may be a nut.

From a second aspect the present disclosure provides an apparatus for converting rotational movement into linear movement, said apparatus comprising: a screw member having a threaded external surface; a sleeve member having a threaded interior surface for receiving the threaded external surface of the screw member; wherein the threaded surfaces are configured so that rotation of the screw member relative to the sleeve member, in use, causes the screw member to move axially relative to the sleeve member; and at least one conduit extending through the sleeve member to the threaded interior surface for applying pressure to a region between the threaded interior surface of the sleeve member and the threaded exterior surface of the screw member.

Each of said at least one conduit may extend from an opening in a radially exterior surface of the sleeve member to at least one opening in a radially interior surface of the sleeve member.

The may comprise a plurality of said conduits having a plurality of said openings arranged circumferentially spaced around the interior surface of the sleeve member; and/or comprise a plurality of said conduits having a plurality of said openings arranged longitudinally spaced along the interior surface of the sleeve member.

The openings may be spaced substantially equidistantly around the circumference of the interior surface.

The threaded interior surface of the sleeve member may form a helical ridge on the interior surface; wherein each of the at least one conduit may extend radially inwards through the sleeve member and radially inwards through the ridge to one or more opening in the interior surface.

The one or more opening may be in one or more side wall of said ridge.

The threaded exterior surface of the screw member may form a helical ridge on the exterior surface, wherein said one or more conduit openings in the sleeve member may face one or more side wall of the ridge on the screw member.

The apparatus may comprise a force applicator arranged and configured to force a fluid into said at least one conduit and out of said one or more conduit openings in the sleeve member so as to exert a force on said one or more side wall of the ridge on the screw member, optionally so as to create a bearing force so that the screw member may carry a load in its radial and/or axial directions without the threads on the screw contacting the threads on the sleeve.

The apparatus may comprise a force applicator arranged and configured to apply a force into said at least one conduit for applying pressure to the region between the screw member and sleeve member so as to urge the external surface of the screw member and the opposing interior surface of the sleeve member apart from each other.

The force applicator described herein (e.g. described in relation to the first and/or second aspect of the disclosure) may comprise a pump or piston for pressurising the region between screw member and sleeve member.

The force applicator may be configured to urge a fluid into said region at a pressure above ambient pressure.

The apparatus may comprise a source of fluid for supplying said fluid to said force applicator; optionally wherein the fluid is a lubricating fluid, such as oil.

The apparatus may be configured such that the force applicator applies said pressure to the region between the threaded interior surface of the sleeve member and the threaded exterior surface of the screw member.

The region between the threaded interior surface of the sleeve member and the threaded exterior surface of the screw member is optionally an annular region between the screw member and the sleeve member.

The apparatus may be configured such that when the force applicator applies said pressure, in use, the threaded interior surface of the sleeve member does not contact the threaded exterior surface of the screw member. Alternatively, or additionally, the exterior surface of the screw member and the interior surface of the sleeve member may be substantially cylindrical, and the apparatus may be configured such that when the force applicator applies said pressure, in use, the screw member is radially centralised within the sleeve member.

The apparatus may comprise a fluid return line for receiving fluid flowing away from or out of the region between the sleeve member and screw member and returning the fluid to said source of fluid.

The present disclosure also provides a valve for controlling the flow of fluid, the valve comprising: a housing having a fluid inlet port, a fluid outlet port and a fluid channel therebetween; a valve closure member that is movable for varying an opening in the fluid channel so as to control the fluid flow between the inlet and outlet ports; and the apparatus for converting rotational movement into linear movement that is described herein; wherein the valve closure member is coupled to the screw member or sleeve member such that rotation of the screw member relative to the sleeve member, in use, causes the valve closure member to move so as to vary the opening in the fluid channel The screw member may comprise a valve spool forming said valve closure member.

The valve may comprise a motor coupled to said screw member or sleeve member for rotating said screw member relative to the sleeve member.

The valve may be a proportional valve and/or a servo-valve.

The valve may be a hydraulic valve for controlling the flow of hydraulic fluid.

The present disclosure also provides a machine for controllably moving a work-piece, the machine comprising: the apparatus as described above; a mounting surface for receiving or mounting the work-piece thereto, wherein the mounting surface is coupled to said screw member or sleeve member such that rotation of the screw member relative to the sleeve member, in use, causes the mounting surface to move.

The present disclosure also provides a method of forming a conduit through a sleeve member comprising a threaded interior surface that forms a helical ridge on the interior surface; the method comprising drilling radially inwards through the sleeve member and radially inwards through the ridge so as to form one or more opening in the interior surface on one or more side wall of the ridge.

The method may be used to form one or more of the conduits in the sleeve members described herein, and or to form the assembly, valve or machine described herein.

BRIEF DESCRIPTION OF THE DRAWINGS

Various embodiments will now be described, by way of example only, and with reference to the accompanying drawings in which:

FIG. 5A shows a top-down schematic of the nut after some of the conduits have been drilled;

DETAILED DESCRIPTION

Figure 1A:
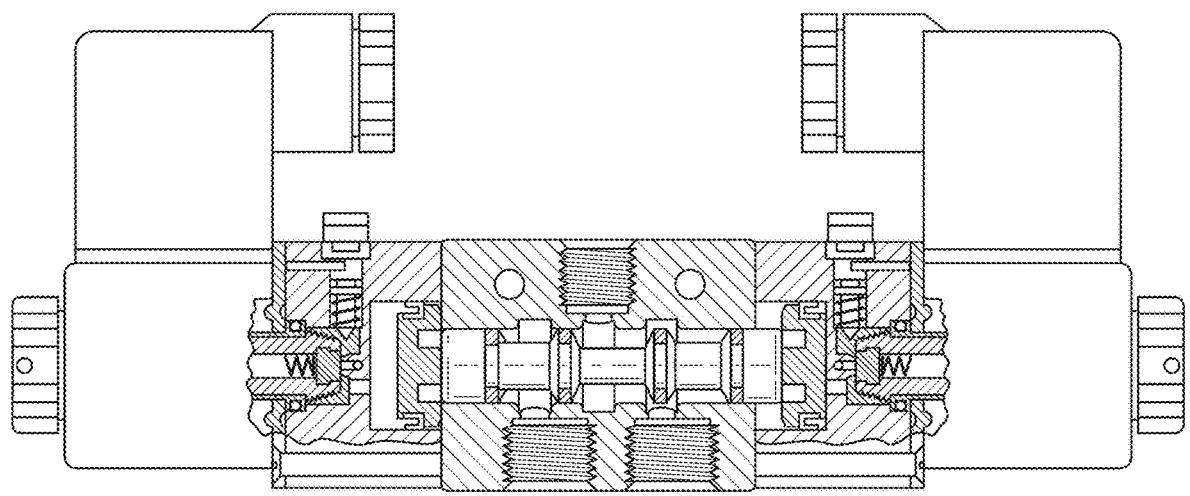
FIG. 1A shows a schematic of a valve according to the prior art.
Figure 1B:
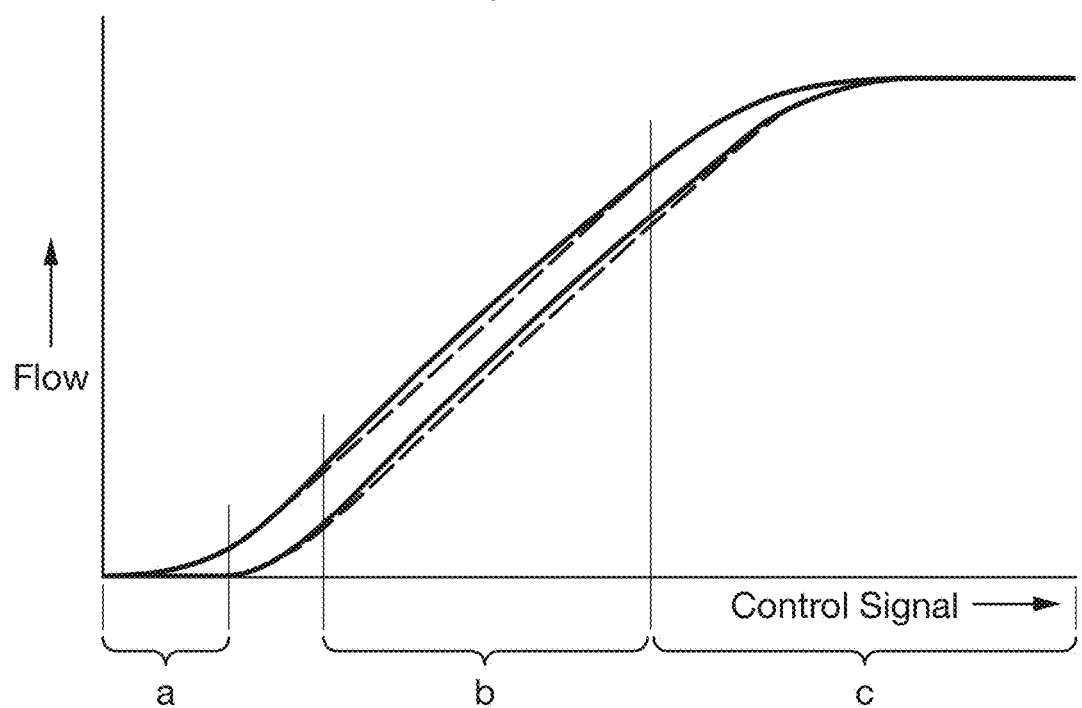
FIG. 1B shows the fluid flow characteristics through such a valve.
Figure 2:
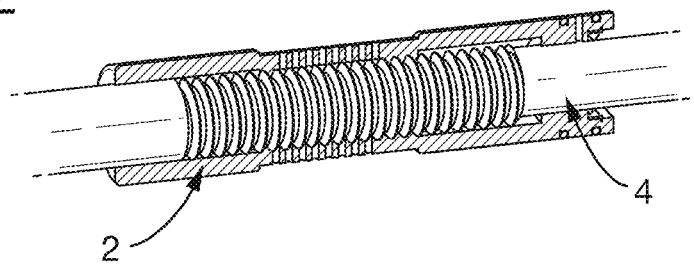
FIG. 2 shows a schematic of an embodiment comprising a nut and a screw received within the nut.

FIG. 2 shows a schematic of an embodiment of the present disclosure comprising a sleeve member 2 and a screw member 4 received within the sleeve member 2. In the illustrated embodiment, the sleeve member 2 is a nut and the screw member 4 is a screw. The nut 2 and screw 4 may form part of a hydraulic valve (not shown), e.g. servo valve. Although the nut 2 circumferentially surrounds at least part of the screw 4, the nut 2 is shown in cross-section in FIG. 2 so that the features of the screw 4 that are within the nut 2 can be seen. The screw 4 is an elongated member having a helical thread around its external surface. The thread extends along at least a portion of the length of the screw 4. The nut 2 comprises a helical thread on its interior surface for cooperation with the external thread on the nut 2. The threads on the nut 2 and screw 4 are arranged and configured such that circumferential rotation of the nut 2 relative to the screw 4 causes the screw 4 to move in a direction along its longitudinal axis, relative to the nut 2.

According to embodiments a lubricating fluid, such as oil, is provided between the radially inner surface of the nut 2 at which its thread is located and the radially outer surface of the screw 4 at which its thread is located, so as to lubricate the rotation of the nut 2 relative to the screw 4.

According to at least some of the embodiments, the lubricating fluid is pressurised. The lubricating fluid may be pressurised such that the pressure of the fluid exerts a force between the nut 2 and screw 4 that may substantially radially centralise the screw 4 within the nut 2 (at least along the threaded portions of the nut and screw). In other words the pressurised fluid may push the threaded inner surface of the nut 2 away from the threaded outer surface of the screw 4. The fluid may be pressurised in this manner such that there is substantially no physical contact between the screw 4 and nut 2 (at least along the threaded portions) since the fluid remains between them. This reduces wear, friction, energy consumption and the requirement to replace the components of the assembly.

Figure 3:
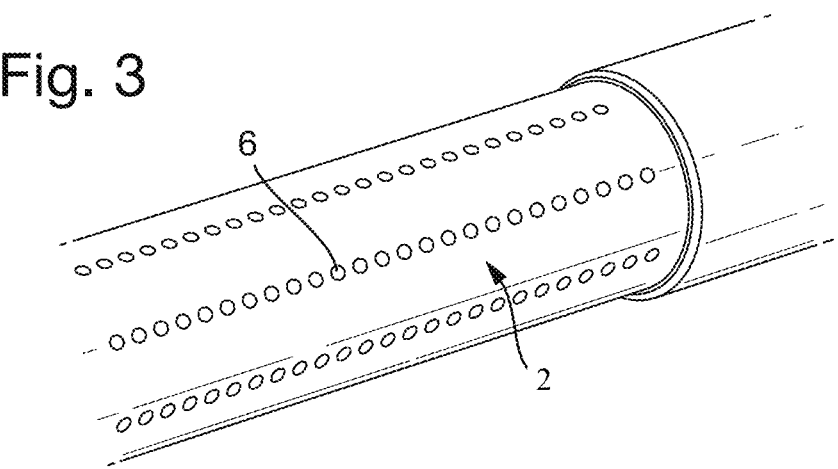
FIG. 3 shows a perspective view of a portion of the nut in FIG. 2.

FIG. 3 shows a perspective view of the portion of the nut 2 circled in FIG. 2. It can be seen that the nut 2 may have one or more conduits 6 extending from the radially outer surface of the nut 2 to the radially inner surface of the nut 2. In the embodiment shown, the nut 2 has a plurality of rows of such conduits 6 extending through the nut 2 from the external surface to the interior surface. These conduits 6 enable the lubricating fluid to be injected between the threads of the nut 2 and screw 4. The conduits 6 also enable the lubricating fluid between the nut 2 and screw 4 to be pressurised.

Figure 4:
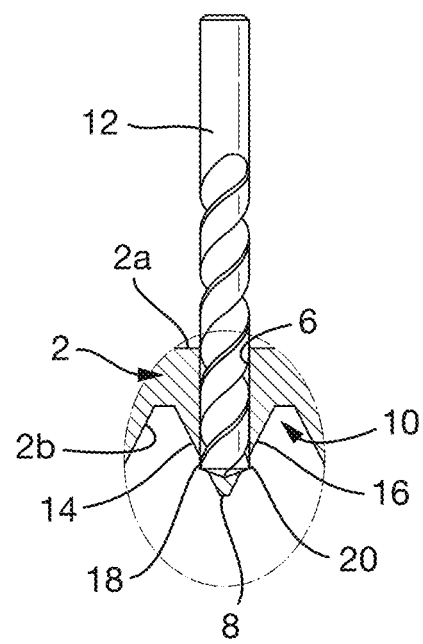
FIG. 4 shows a schematic of an embodiment for forming conduits in the nut.

FIG. 4 shows a schematic of one embodiment for forming the conduits 6 in the nut 2. FIG. 4 shows a cross-sectional view through a portion of an upper wall of the nut 2, i.e. such that the upper surface 2a of the portion shown is the radially outer surface of the nut 2 and the lower surface 2b of the portion shown is the threaded interior surface of the nut 2. Each conduit 6 may be formed by drilling from the radially outer surface 2a of the nut 2, through the wall of the nut 2 to the radially interior surface 2b. The threaded surface 2b of the nut 2 forms a helical ridge 8 and a helical valley 10 around the nut interior surface 1b. The diameter of the drill bit 12 used in the drilling may be selected to be smaller than width of the base of the ridge 8 (in the longitudinal direction of the screw 4), but larger than the width of the tip of the ridge 8. The drilling may be performed such that the drill bit 12 passes through the base of the ridge 8 and through the ridge towards its tip. As the drill bit 12 progresses towards the interior surface 2b of the nut 2, it breaks through the interior surface 2b of the nut 2 at locations on either side wall 14,16 of the ridge 8 so as to form holes 18,20 on either side wall of the ridge. The drilling may halted at this stage, thereby forming a conduit 6 from the exterior surface 2a of the nut 2 that is connected to both holes 18,20 on either side wall 14,16 of the ridge 8, in a single drilling operation. In other words, the drilling may be performed such that the free end of the drill bit 12 does not entirely pass through the inner surface 2b of the nut 2. A plurality of such drilling operations may be performed, e.g. one for each of the conduits 6 shown in FIG. 3.

FIG. 5A shows a schematic of a top-down view of the nut 2 after some of the conduits 6 have been drilled. The central portion of the nut 2 is illustrated as being translucent purely for illustrative purposes so that it is possible to see the arrangement of the threaded surface on the interior 2b of the nut 2. As can be seen from FIG. 5A, each conduit 6 that is drilled through the exterior surface 2a of the nut 2 breaks through the interior surface 2b on opposing side walls of the ridge 8 of the thread so that the conduit 6 is in fluid communication with the two holes 18,20 through the interior surface 1b.

Figure 5B:
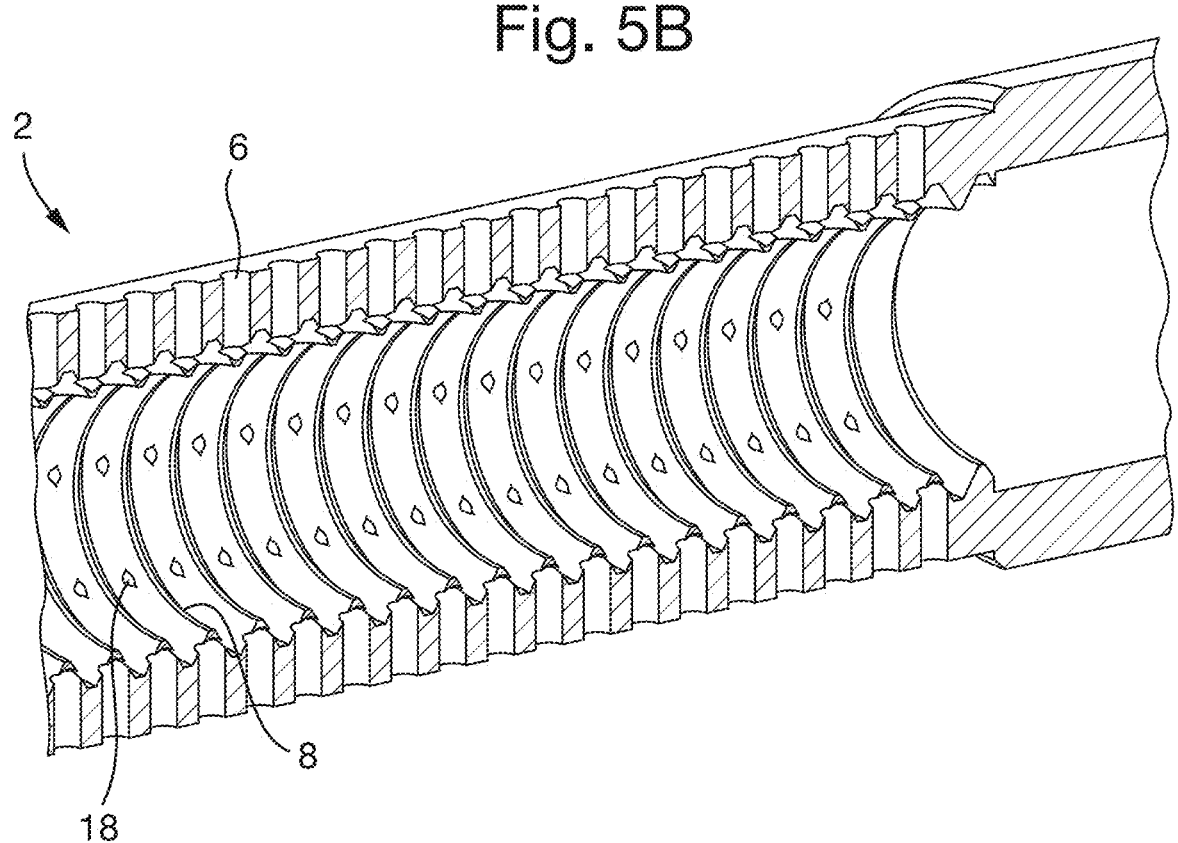
FIG. 5B shows a cross-sectional perspective view of the nut.

FIG. 5B shows a cross-sectional perspective view of the nut 2, illustrating the conduits 6 formed through the wall of the nut 2 and some of the resulting holes 18 formed on either side wall of the ridge 8. In the view of FIG. 5B only the holes 18 on one side of the ridge 8 can be seen as the holes 20 on the other side are obscured from view by the ridge 8 itself.

Figure 5C:
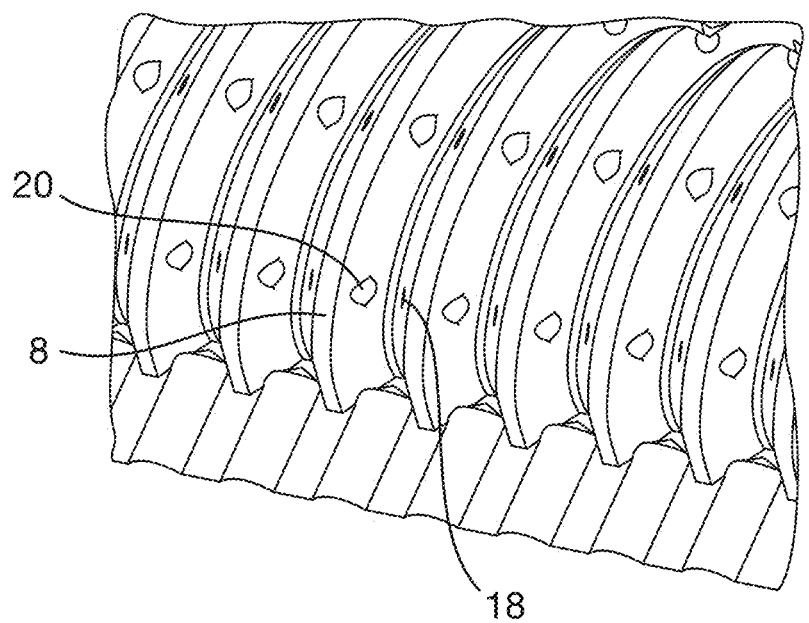
FIG. 5C shows another view of the interior threaded surface of the nut.

FIG. 5C shows another view of the interior threaded surface 2b of the nut 2 in which the two holes 18, 20 formed on either side of the ridge 8 by each drilling operation can be seen.

Figure 6:
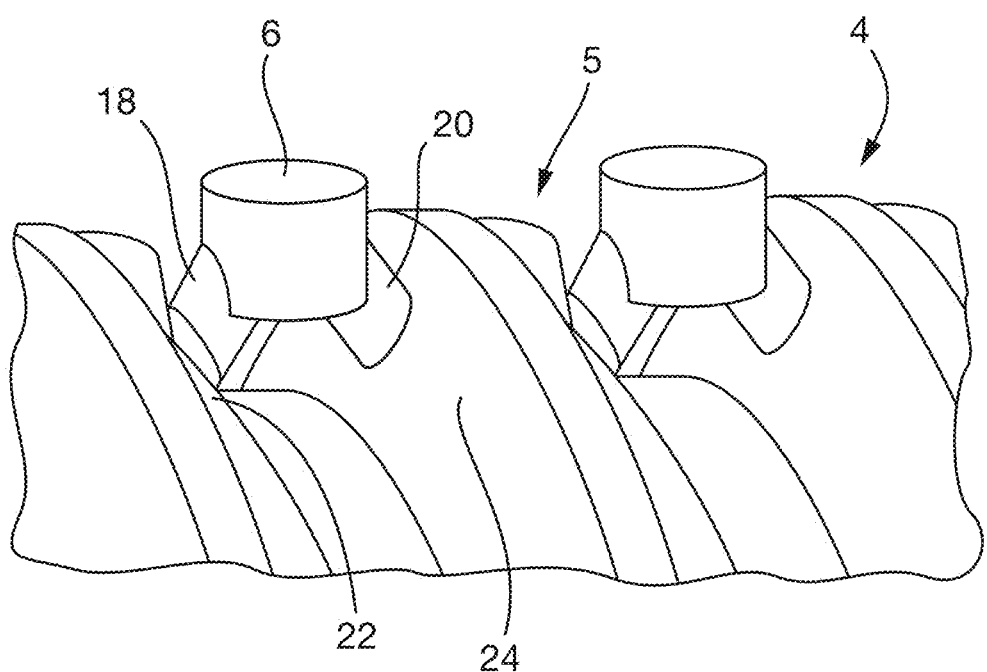
FIG. 6 shows a schematic illustrating a threaded portion of the screw.

FIG. 6 shows a schematic illustrating a threaded portion of the screw 4. The nut 2 around the screw 4 is not illustrated, in order to enable the screw 4 to be viewed, although the conduits 6 through the nut 2 are illustrated. As described above, each drilling operation forms a conduit 6 that breaks through the interior surface 2b of the nut 2 so as to form two holes 18, 20 on either side wall of the ridge 8. As described above, lubricating fluid may be forced into the nut 2 through each conduit 6 in its external surface 2a. This fluid passes through the conduit 6 and out of the holes 18, 20 on either side wall of the ridge 8. As the screw 4 has a threaded exterior surface 5 that compliments the interior thread on the nut 2, the pressurised fluid exiting the interior surface 2b of the nut 2 acts on the opposing side walls 22,24 of the ridge of the screw thread, thereby urging the nut 2 radially outwards relative to the screw 4. Multiple such conduits 6 and their associated holes 18,20 may be arranged circumferentially around the nut 2 so that the urging force created by the fluid radially centres the screw 4 relative to the nut 2 (e.g. at least three conduits 6 that may be equidistantly spaced around the circumference). The rotation of the nut 2 relative to the screw 4 may therefore be performed with minimal friction, backlash and wear.

Additionally, or alternatively, to the conduits 6 being arranged to radially centre the screw 4 relative to the nut 2, the conduits 6 may be arranged such that the pressurised fluid exiting the interior surface 2b of the nut 2 acts on the opposing side walls 22,24 of the ridge of the screw thread, thereby urging the screw 4 so as to move longitudinally through the nut 2.

The number and/or area of the holes 18,20 in the interior surface 2b of the nut 2, and/or the pressure of the lubricating fluid may be selected so as to provide the desired force for radially or axially urging the screw 4 relative to the nut 2.

Although a drilling operation has been described that forms two holes 18,20 on either side of the nut thread, it is contemplated that in the drilling operation the free end of the drill bit 12 may pass through the interior surface 2b of the nut 2 so as to only form a single hole through the interior surface (e.g. the end of the drill bit may entirely pass through the interior surface of the nut).

The screw-nut assembly described herein may be used in a variety of applications to convert rotational movement of the screw 4 relative to the nut 2 into axial movement of the screw 4 relative to the nut 2. For example, the assembly may be used in a valve such as a proportional valve or a servo-valve, e.g. in aircraft systems, automotive systems, or industrial machinery.

Figure 7A:
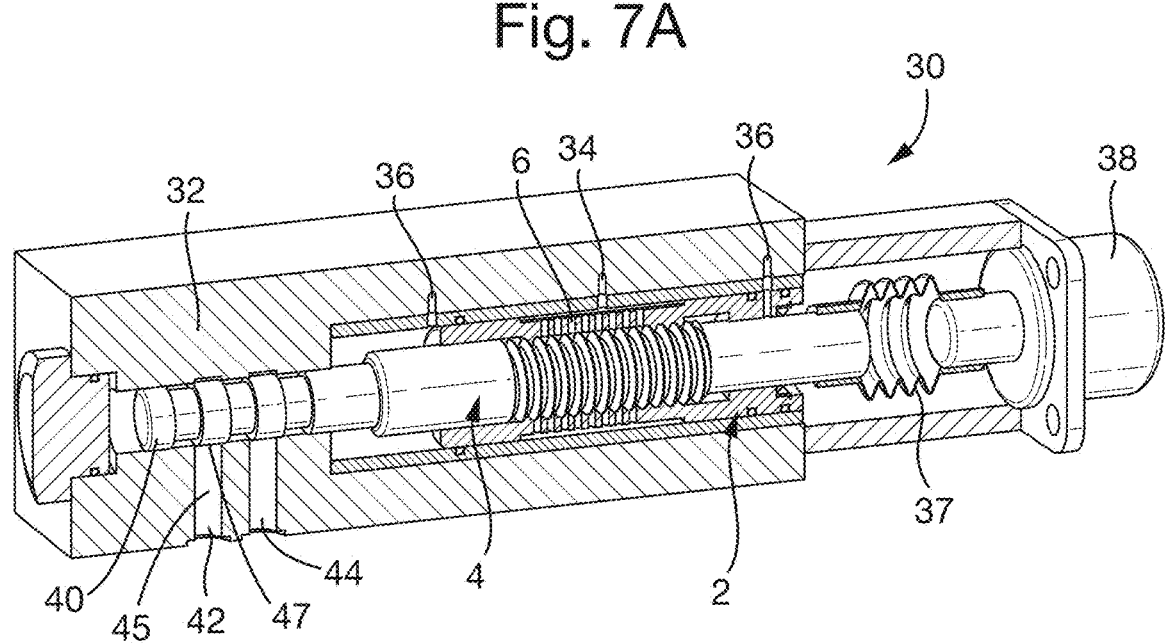
FIG. 7A illustrates a schematic perspective view of a hydraulic valve according to an embodiment.
Figure 7B:
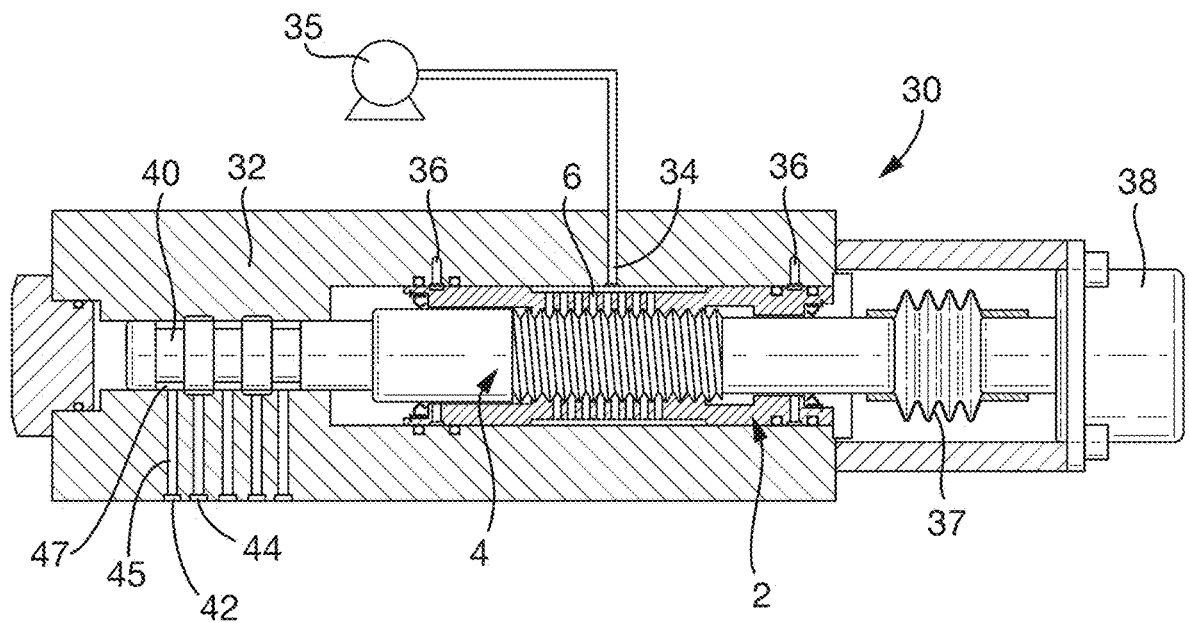
FIG. 7B shows a cross-sectional view of the embodiment of FIG. 7A.

FIG. 7A illustrates a schematic, perspective view of a hydraulic valve 30 according to an embodiment. FIG. 7B shows a cross-sectional view of the embodiment of FIG. 7A (except that five hydraulic fluid inlet/outlet ports are shown rather than two). The valve 30 comprises a housing 32 that houses a nut 2 and a screw 4 received within the nut 2. The housing 30 circumferentially surrounds the screw 2 and nut 4, although in FIG. 7A part of the housing has 30 been cut away to show various interior features. Both the nut 2 and screw 4 have complementary threaded surfaces and the nut 2 has conduits 6 through it for supplying lubricating fluid between the threads of the nut 2 and screw 4, as described hereinabove. The housing 30 has a lubricating fluid supply line 34 for supplying the lubricating fluid to the conduits 6 in the nut 2. A force applicator 35 (e.g. a pump or piston) is provided for forcing the lubricating fluid into the lubricating fluid supply line 34. The housing 30 may also have a lubricating fluid return line 36 at one or both longitudinal ends of the nut 2 for receiving lubricating fluid. The screw 4 is coupled at one of its ends via a coupling 37 to a motor 38 such that the motor may rotate the screw 4 about its longitudinal axis. The other end of the screw 4 is configured as a valve spool 40 and is arranged in slidable communication with a hydraulic fluid inlet port 42 and a hydraulic fluid outlet port 44. A fluid channel 45 is arranged between the fluid inlet port 42 and the fluid outlet port 44 and the valve spool acts as a valve closure member 40 that is movable for varying the size of an opening 47 in the fluid channel (e.g. to open and close the opening) so as to control the fluid flow between the inlet and outlet ports 42, 44.

In operation, the force applicator 35 forces lubricating fluid through the lubricating fluid supply line 34 and into the conduits 6 in the nut 2 under pressure such that the lubricating fluid exits the inner surface 2b of the nut 2 and urges against the outer surface of the screw 4. As described above, the conduits 6 through the nut 2 may be arranged and configured such that the pressurised lubricating fluid causes the screw 4 to be maintained in a radial central position within the nut 2 and optionally such that the thread on the nut 2 does not contact the thread on the screw 4. The motor 38 is operated so as to rotate the coupling 37 and hence rotate the screw 4 about its longitudinal axis. Due to the cooperating threads on the screw 4 and nut 2, this causes the screw 4 to move along its longitudinal axis relative to the nut 2 and hence move relative to the housing 30. It will be appreciated that even though the threads on the nut 2 and screw 4 may not be in physical contact due to the pressurised lubricating fluid radially centralising the screw 4, the arrangement of the helical ridge 8 on the screw 4 within the helical valley on the nut 2 (and the arrangement of the helical ridge on the nut within the helical valley on the screw) will still result in axial movement of the screw 4 relative to the nut 2 when the screw is rotated relative to the nut. The motor 38 therefore moves the screw 4 and its valve spool 40 relative to the hydraulic fluid inlet and outlet ports 42, 44 in the housing 30. The motor 38 is therefore able to control the hydraulic fluid flow into the inlet port 42 and out of the outlet port 44. The coupling 37 between the motor 38 and screw 4 may be configured to accommodate movement of the screw 4 relative to the motor 38 whilst the motor is driving the screw. Any lubricating fluid that leaves the nut 2 at one or both longitudinal ends of the nut may be received at the lubricating fluid return line(s) 36. The return line(s) 36 may recycle the lubricating fluid back to the lubricating fluid supply line 34 for reinjection back into the nut 2.

The stroke of the valve spool 40 may be, for example, ±0.2 mm (±0.0079 in) such as in typical servo valves.

The valve may be a direct screw servo valve.

Figure 7C:
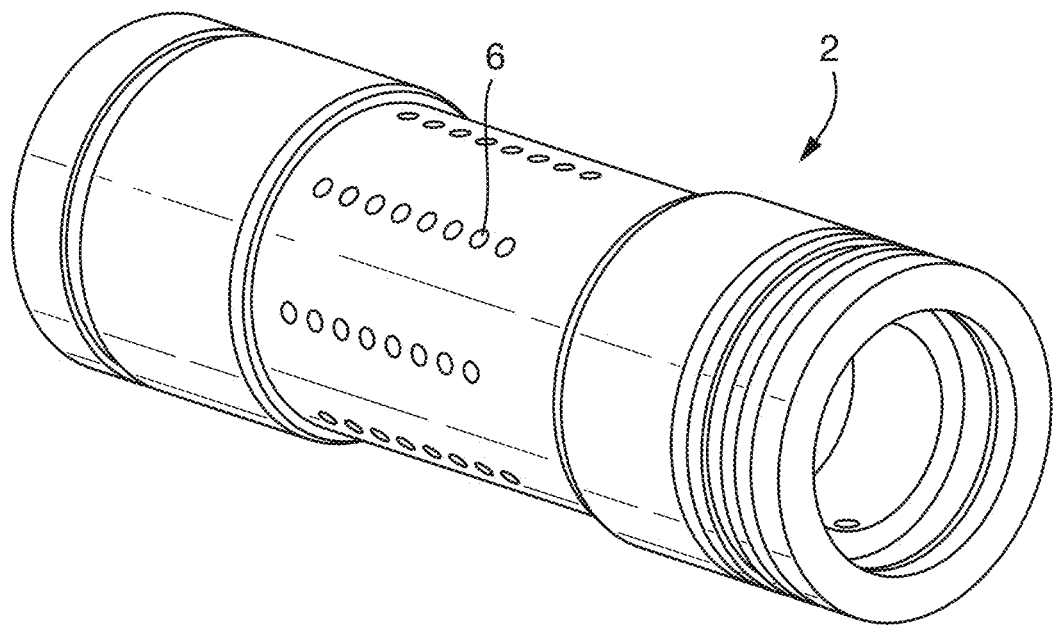
FIGS. 7C-7D show perspective and cross-sectional views of the nut respectively.
Figure 7D:
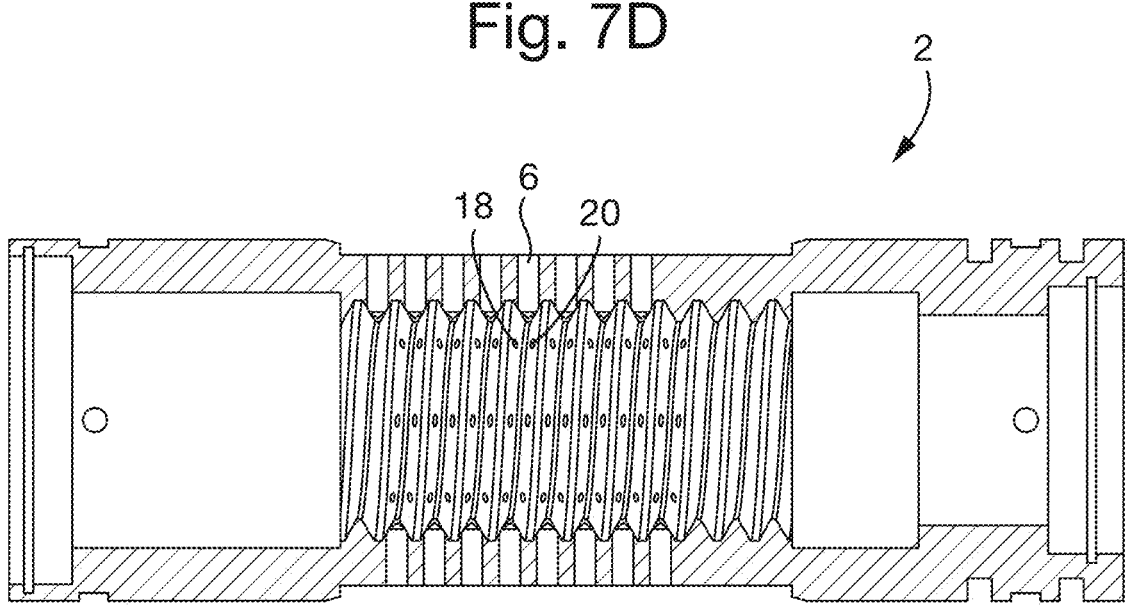

FIGS. 7C and 7D show perspective and cross-sectional views of the nut 2, respectively.

Figure 7E:
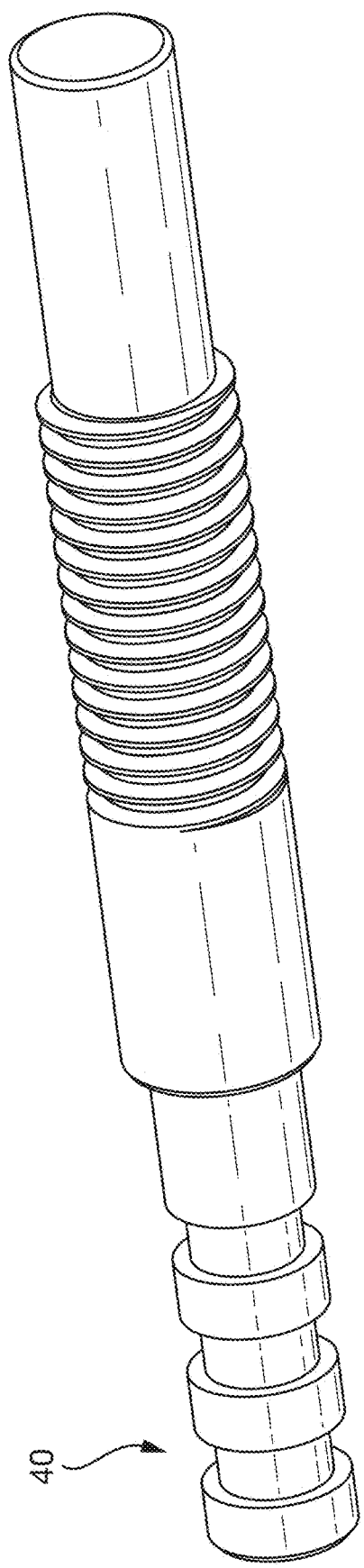
FIGS. 7E-7F show perspective and cross-sectional views of the screw respectively.
Figure 7F:
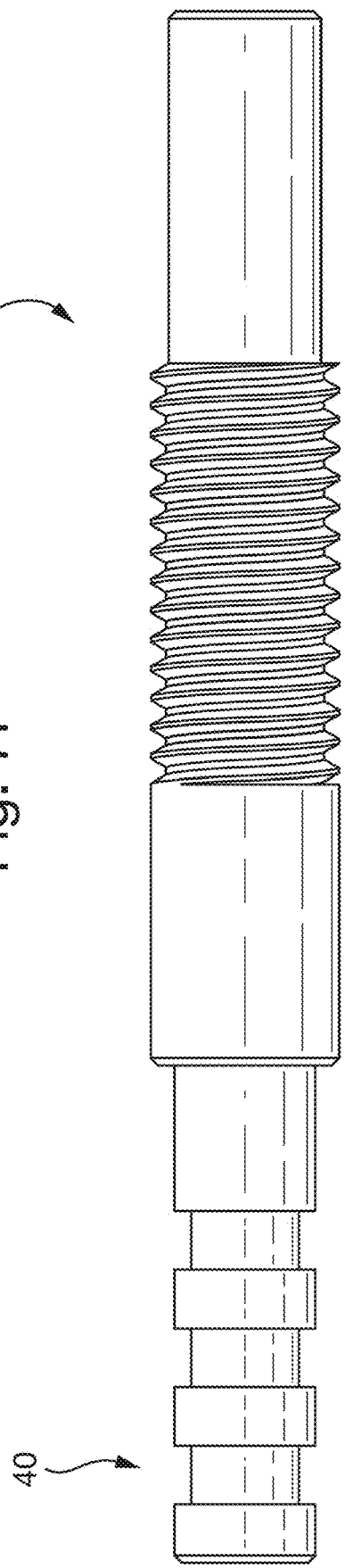

FIGS. 7E and 7F show perspective and cross-sectional views of the screw 4, respectively.

Although the present disclosure has been described with reference to various embodiments, it will be understood by those skilled in the art that various changes in form and detail may be made without departing from the scope of the invention as set forth in the accompanying claims.

For example, it is contemplated that the screw valve may be mounted in a housing and configured to be operable either as a servo-valve or a proportioning valve. The screw valve may be controlled such that it performs relatively fast and coarse movements in a proportional valve mode and relatively slow and accurate movements in a servo-valve mode. Such a screw-valve may be used in applications such as, for example, a space craft (e.g. a space shuttle) in order to connect one object with another object. A single screw-valve can be operated in the two modes so as to perform a quick coarse approach in a first mode and then a slower precise connection between the two objects in the second mode. Another exemplary application of such as screw-valve is in the rolling process of metal (e.g. to form sheet metal). The servo-valve can be used in a first mode to provide relatively coarse movements of the metal (e.g. into and/or out of the processing machine), whereas the screw-valve may be operated in the servo-valve mode for fine control of the movement of the metal within the machine. This is in contrast to conventional machinery, which currently require two hydraulic systems to perform these functions. Accordingly, embodiments provide a machine for controllably moving a work-piece.

Although embodiments have been described in which the screw and nut assembly are employed in a valve, the assembly may be applied in other systems. For example, the assembly may be a ball screw.

The apparatus described herein may be used in aircraft, automotive systems (e.g. in the steering gear for a vehicle), or industrial machinery, for example.

The invention claimed is:

1. An apparatus for converting rotational movement into linear movement, said apparatus comprising:
   a screw member having a threaded external surface;
   a sleeve member having a threaded interior surface for receiving the threaded external surface of the screw member; wherein the threaded interior surface of the sleeve member forms a helical ridge on the interior surface; and wherein the threaded surfaces are configured so that rotation of the screw member relative to the sleeve member, in use, causes the screw member to move axially relative to the sleeve member; and
   at least one conduit extending through the sleeve member to the threaded interior surface for applying pressure to a region between the threaded interior surface of the sleeve member and the threaded exterior surface of the screw member;
   wherein each of said at least one conduit extends from an opening in a radially exterior surface of the sleeve member radially inwards through the sleeve member and radially inwards through the ridge to at least two openings in a radially interior surface of the sleeve member.

2. The apparatus of claim 1, wherein in use, fluid passes through each of said at least one conduit from the opening in the radially exterior surface to the openings in the radially interior surface.

3. The apparatus of claim 1, comprising a plurality of said conduits having a plurality of said openings arranged circumferentially spaced around the interior surface of the sleeve member and longitudinally spaced along the interior surface of the sleeve member.

4. The apparatus of claim 1, wherein the openings are in both side walls of said ridge.

5. The apparatus of claim 1, wherein the threaded exterior surface of the screw member forms a helical ridge on the exterior surface, and wherein said conduit openings in the sleeve member face one or more side wall of the ridge on the screw member.

6. The apparatus of claim 5, comprising a force applicator arranged and configured to force a fluid into each of said at least one conduit through the opening in the radially exterior surface and out of said conduit openings in the radially interior surface of the sleeve member so as to exert a force on said one or more side wall of the ridge on the screw member.

7. The apparatus of claim 1, comprising a force applicator arranged and configured to apply a force into said at least one conduit for applying pressure to the region between the screw member and sleeve member so as to urge the external surface of the screw member and the opposing interior surface of the sleeve member apart from each other.

8. The apparatus of claim 6, wherein the force applicator comprises a pump or piston for pressurising the region between screw member and sleeve member.

9. The apparatus of claim 8, wherein the force applicator is configured to urge a fluid into said region at a pressure above ambient pressure.

10. The apparatus of claim 9, wherein the force applicator applies said pressure to the region between the threaded interior surface of the sleeve member and the threaded exterior surface of the screw member.

11. The apparatus of claim 10, wherein the apparatus is configured such that when the force applicator applies said pressure, in use, the threaded interior surface of the sleeve member does not contact the threaded exterior surface of the screw member; and/or
   wherein the exterior surface of the screw member and the interior surface of the sleeve member are substantially cylindrical, and the apparatus is configured such that when the force applicator applies said pressure, in use, the screw member is radially centralised within the sleeve member.

12. A valve for controlling the flow of fluid comprising:
   the apparatus of claim 1;
   a housing having a fluid inlet port, a fluid outlet port and a fluid channel therebetween;
   a valve closure member that is movable for varying an opening in the fluid channel so as to control the fluid flow between the inlet and outlet ports; and
   wherein the valve closure member is coupled to said screw member or sleeve member such that rotation of the screw member relative to the sleeve member, in use, causes the valve closure member to move so as to vary the opening in the fluid channel.

13. The apparatus of claim 6, wherein the force applicator is arranged and configured to force the fluid so as to create a bearing force so that the screw member may carry a load in its radial and/or axial directions without the threads on the screw contacting the threads on the sleeve.

* * * * *